(12) United States Patent
Köck et al.

(10) Patent No.: US 9,347,448 B2
(45) Date of Patent: May 24, 2016

(54) CONTROL VALVE FOR AN OIL-INJECTED SCREW-TYPE COMPRESSOR

(75) Inventors: Engelbert Köck, Planegg (DE); Michael Hofstetter, Wolfersdorf (DE)

(73) Assignee: KNORR-BREMSE SYSTEME FUR SCHIENENFAHRZEUGE GMBH, Munich (DE)

( * ) Notice: Subject to any disclaimer, the term of this patent is extended or adjusted under 35 U.S.C. 154(b) by 630 days.

(21) Appl. No.: 13/640,895

(22) PCT Filed: Apr. 13, 2011

(86) PCT No.: PCT/EP2011/055764
§ 371 (c)(1),
(2), (4) Date: Dec. 3, 2012

(87) PCT Pub. No.: WO2011/128354
PCT Pub. Date: Oct. 20, 2011

(65) Prior Publication Data
US 2013/0068322 A1    Mar. 21, 2013

(30) Foreign Application Priority Data
Apr. 16, 2010  (DE) .......................... 10 2010 015 152

(51) Int. Cl.
*F25B 31/00* (2006.01)
*G05D 23/12* (2006.01)
(Continued)

(52) U.S. Cl.
CPC .................. *F04C 29/02* (2013.01); *B60T 17/04* (2013.01); *F04C 29/028* (2013.01); *F04C 18/16* (2013.01); *F04C 2270/701* (2013.01); *F16K 11/0716* (2013.01); *Y10T 137/7737* (2015.04)

(58) Field of Classification Search
CPC ........ F04C 29/02; F04C 29/028; F04C 18/16; F04C 2270/701; F16K 11/0716
See application file for complete search history.

(56) References Cited

U.S. PATENT DOCUMENTS

| 4,475,876 A | 10/1984 | Olen |
| 4,537,346 A | 8/1985 | Duprez |

(Continued)

FOREIGN PATENT DOCUMENTS

| CA | 1 184 307 | 3/1985 |
| CN | 1602391 A | 3/2005 |

(Continued)

OTHER PUBLICATIONS

Chinese Office Action with English translation, dated Jul. 29, 2014 for Chinese Patent Application No. 201180019504.2.

(Continued)

*Primary Examiner* — Mohammad M Ali
*Assistant Examiner* — Daniel C Comings
(74) *Attorney, Agent, or Firm* — Barnes & Thornburg LLP

(57) ABSTRACT

A control valve for an oil-injected screw-type compressor, in particular for installation in a vehicle, wherein oil located in a screw-type compressor housing can be supplied in a controlled manner via the control valve to a heat exchanger and/or to a bypass in such a way that cold oil is conducted through a bypass around the heat exchanger and warm oil is conducted through the heat exchanger. A control valve is provided for an oil-injected screw-type compressor and ensures rapid heating of the oil in the screw-type compressor even with a short activation time. The control valve has a control piston that is actuated by a control element and cooperates respectively with a heat exchanger opening disposed in a control valve housing and a bypass opening, and that the control piston controls at least one bypass opening which cooperates with the heat exchanger opening.

13 Claims, 2 Drawing Sheets

(51) Int. Cl.
  *F04C 29/02*   (2006.01)
  *B60T 17/04*   (2006.01)
  *F16K 11/07*       (2006.01)
  *F04C 18/16*       (2006.01)

(56) References Cited

U.S. PATENT DOCUMENTS

| | | |
|---|---|---|
| 8,123,499 B2 | 2/2012 | Koeck et al. |
| 2001/0046443 A1 | 11/2001 | Van De Putte |
| 2005/0089432 A1* | 4/2005 | Truyens et al. ............ 418/83 |
| 2007/0194140 A1 | 8/2007 | Nestler et al. |
| 2009/0020718 A1* | 1/2009 | Stallmann ........... F16K 11/0708 251/324 |

FOREIGN PATENT DOCUMENTS

| | | |
|---|---|---|
| CN | 201265528 Y | 7/2009 |
| CN | 201330707 Y | 10/2009 |
| CN | 201386654 Y | 1/2010 |
| DE | 27 15 610 A1 | 10/1977 |
| DE | 31 22 361 A1 | 12/1982 |
| DE | 603 04 555 | 2/2007 |
| DE | 10 2006 010 723 A1 | 9/2007 |
| DE | 102006010723 A1 | 9/2007 |
| DE | 102007005557 A1 | 10/2008 |
| EP | 1024257 A2 | 8/2000 |
| GB | 190227562 A * | 0/1903 |
| GB | 1 557 296 | 12/1979 |
| JP | 52-131205 A | 11/1977 |
| JP | 59-131593 U | 9/1984 |
| JP | 2-248787 A | 10/1990 |
| JP | 2002-137747 A | 5/2002 |

OTHER PUBLICATIONS

Japanese Office Action for Japanese Patent No. 2013-504251 dated Mar. 23, 2015, along with the English translation.
Notification Concerning Transmittal of International Preliminary Report on Patentability and Written Opinion of the International Search Authority for International Patent Application No. PCT/EP2011/055764, dated Apr. 13, 2011.
English Translation of Notification Concerning Transmittal of International Preliminary Report on Patentability and Written Opinion of the International Search Authority for International Patent Application No. PCT/EP2011/055764, dated Apr. 13, 2011.
Search Report for International Patent Application No. PCT/EP2011/055764; Jul. 26, 2011.

\* cited by examiner

CONTROL VALVE FOR AN OIL-INJECTED SCREW-TYPE COMPRESSOR

PRIORITY CLAIM

This patent application is a U.S. National Phase of International Patent Application No. PCT/EP2011/055764, filed Apr. 13, 2011, which claims priority to German Patent Application No. 10 2010 015 152.1, filed Apr. 13, 2010, the disclosures of which are incorporated herein by reference in their entirety.

FIELD

The disclosed embodiments concern a control valve for an oil-injected screw-type compressor, in particular for a vehicle installation, wherein oil present in a screw-type compressor housing can be supplied in a controlled manner via the control valve to a heat exchanger and/or to a bypass in such a way that cold oil is conducted through a bypass around the heat exchanger and warm oil is conducted through the heat exchanger.

BACKGROUND

Such a control valve in the form of an oil thermostat is known from DE 10 2006 010 723 A1. This control valve is integrated separately in a drive carrier plate and is connected fluidically and/or electrically via the carrier plate with at least one of the components of the compressor arrangement described. The advantage of this design is that no separate device is required to receive the control valve as this can be attached directly onto/in the carrier plate. One particular advantage is the accessibility of the control valve from the outside of the device, which gives high ease of maintenance. The control valve is designed so that when the oil is cold it flows through a bypass around the heat exchanger, and when the oil is warm it flows through the heat exchanger. No further details of how this is achieved in concrete terms are given in this document.

SUMMARY

Disclosed embodiments are based on the object of providing a control valve for an oil-injected screw-type compressor which ensures rapid heating of the oil of the screw-type compressor even on short connection periods with simultaneously stable control behavior of the valve. This object is achieved in that the control valve comprises a control piston actuated by a control element which co-operates respectively with a heat exchanger opening disposed in a valve housing and a bypass opening, and that the control piston controls at least one further bypass opening co-operating with the heat exchanger opening.

BRIEF DESCRIPTION OF THE FIGURES

Advantageous details of the disclosed embodiments are described with reference to FIG. 1 in which an embodiment example is defined in more detail.

DETAILED DESCRIPTION

Figure 1:
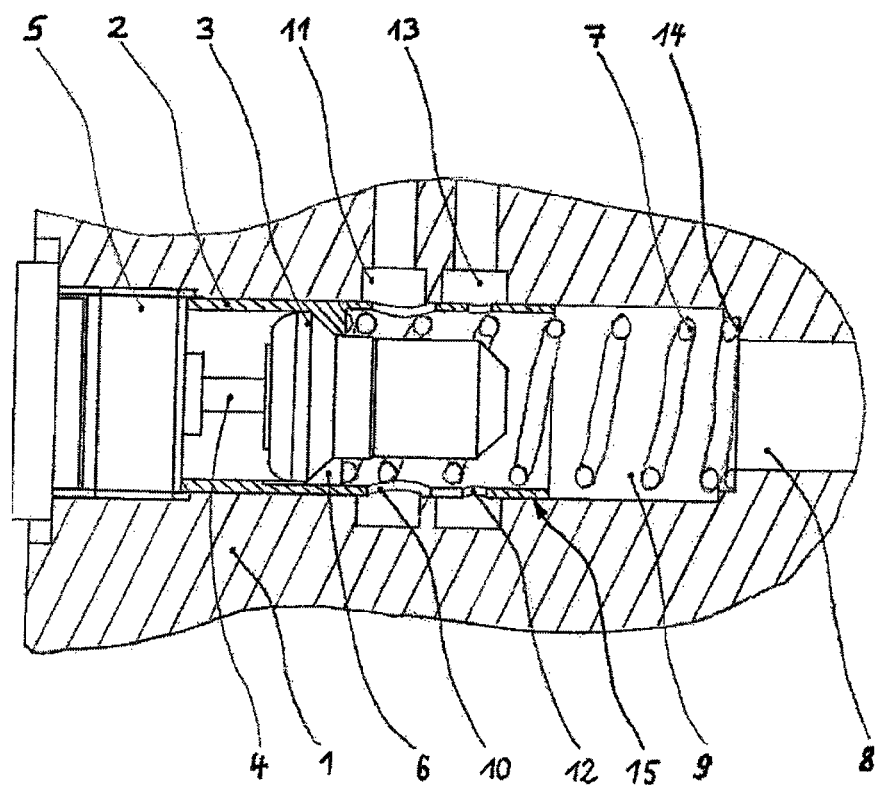
Figure 2:
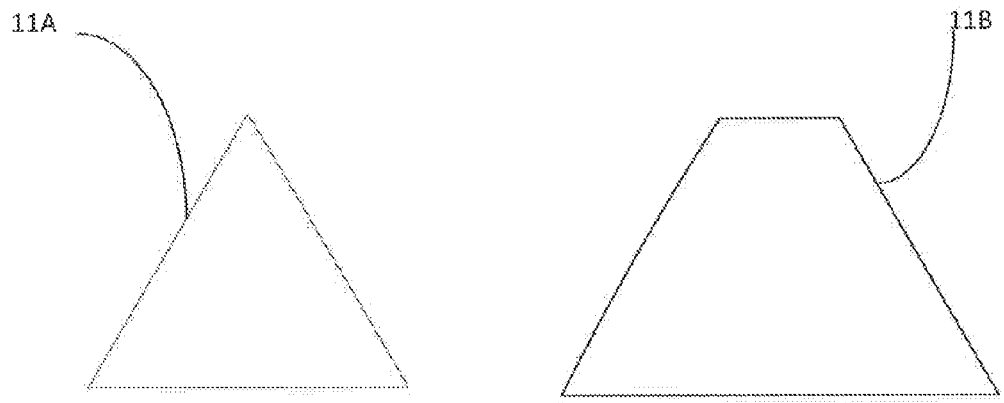
FIG. 2 illustrates triangular or trapezoid shapes of the control opening according to the embodiment example.

In order to prevent valve oscillation, conventional control valves do not have cleanly defined bypass openings but rather such large leakage streams flowing over the cooler that the compressors operated via this do not become really warm on intermittent use. The control openings are also formed such that switching is very sudden. A straight control edge in the piston passes over a straight control edge in the housing. If the gap is merely reduced, this amplifies the temperature shock suffered by the control element due to the cold oil in the cooler, and conversely, and the control element constantly switches to and fro. Forming the control opening as the circle brings an improvement but this is not sufficient to fully suppress oscillation. As the seals in the control element can only tolerate a limited number of switch strokes because of mechanical wear, constant oscillation would lead to a drastic shortening of the life of the control valve.

Presently disclosed embodiments, therefore, are based on the object of providing a control valve for an oil-injected screw-type compressor which ensures rapid heating of the oil of the screw-type compressor even on short connection periods with simultaneously stable control behavior of the valve. This object is achieved in that the control valve comprises a control piston actuated by a control element which co-operates respectively with a heat exchanger opening disposed in a valve housing and a bypass opening, and that the control piston controls at least one further bypass opening co-operating with the heat exchanger opening.

This implementation is firstly based on the knowledge that in former designs, switching from the bypass to the heat exchanger has led to a sudden inflow of cold oil to the screw-type compressor and this has caused the control valve to switch constantly to and fro. With the bypass opening co-operating with the heat exchanger opening according to the disclosed embodiments, it is achieved that even before the actual switching process, a specific quantity of oil is conducted through the heat exchanger and thus firstly severe temperature changes are avoided and secondly problem-free "flushing" of the heat exchanger is achieved at very low ambient temperatures. Because at very low ambient temperatures, the oil is semiliquid and the flow channels through the heat exchanger cause a high flow resistance.

The further bypass opening in the control piston is therefore the decisive addition as this also prevents non-preheated oil from the cooler from suddenly meeting the control element on switching by means of the control opening from the bypass to the cooler, and the control element as a result switching back to the starting position. As the cooler would then be blocked off again, in the prior art a compressor would very quickly become hot and the control valve would again immediately switch to the other direction. A stable situation is not therefore achieved and the control valve "oscillates" to and fro as explained above.

The further bypass opening can be arranged in the control piston. This is the preferred embodiment since in this way the bypass opening can easily be worked into the control piston, for example in the form of a bore or recess. Here different control characteristics can easily be taken into account. It is however also possible within the context to arrange the bypass opening in the control valve housing and for example constitute this with an additional channel which co-operates with the heat exchanger opening in the control valve housing, whereby then the channel opens into the control piston laterally offset to the heat exchanger opening and co-operating with the control outlet.

In a further embodiment, the bypass opening is a leakage opening. A certain quantity of oil is constantly supplied to the heat exchanger through this leakage opening.

In a further refinement the bypass opening is formed circular (with a smaller diameter than the control outlet). A circular bypass opening is particularly easy to produce, wherein several circular openings can be provided in the control piston, where applicable with different diameters and different arrangements.

In a refinement the control opening is also circular (with a larger diameter than the bypass outlet). A circular control opening is also particularly simple to produce, wherein several circular openings, where applicable with different diameters, can be arranged next to each other or transforming into each other in the control piston. This achieves a continuous change in flow through the heat exchanger. To achieve the same effect, the control opening can also be formed triangular 11A or trapezoid 11B, or have any other shape with a changing open size.

In a further embodiment the control element is an expanding element. An expanding element is available as a standard component and can therefore be used in the control valve according to the disclosed embodiments.

In a further embodiment the control valve housing and control valve piston are made from a material with similar thermal expansion behavior. This means that, because of a similar expansion behavior on temperature changes, a tight fit is possible without hindering the freedom of movement of the control element. In this embodiment the production-induced leakage flow between the control valve piston and the control valve housing is minimized. The latter is a requirement for precise control of even small leakage flows via a suitably dimensioned bypass opening.

To summarize, with the control valve according to the disclosed embodiments, it is achieved that the screw-type compressor even with short operating periods rapidly reaches operating temperature without constant switching to and fro between the bypass opening and the heat exchanger opening. Thus the occurrence of condensation and the associated consequences are countered. The minimum connection period of 30% generally applicable previously, e.g. for rail vehicles, which is necessary to prevent the occurrence of condensation or to evaporate any condensate already formed, can thus be reduced to less than 15%.

The control valve according to the disclosed embodiments has a control valve housing 1 which is arranged at an arbitrary location on a screw-type compressor or other component of the assembly co-operating with the screw-type compressor. Alternatively the control valve housing 1 can also be part of the screw-type compressor housing or part of one of its components. The latter can for example be achieved by a gate on the cover of the screw-type compressor housing. The control valve controls the oil flow through a bypass and a heat exchanger of the assembly. The oil is conducted through this for cooling, lubrication and sealing of the screw-type compressor, wherein the cold oil is conducted through a bypass around the heat exchanger and the warm oil is conducted through the heat exchanger.

This control function is performed by a control piston 2 which is arranged moveably in the control valve housing 1. The adjustment movement of the control piston 2 is caused by a control element 3 formed as an expanding element which rests with a piston 4, which can extend out of the control element 3, on a screw plug 5 which is screwed into the end of the bore receiving the control piston 2 in the control valve housing 1. The control element 3 is inserted in an opening in a carrier wall 6 of the control piston 2, wherein furthermore between the carrier wall 6 and a wall 14 delimiting the bore opposite the screw plug 5 is clamped a valve spring 7. The valve spring 7 presses the control piston 2 and hence also the control element 3 in the direction of the screw plug 5.

The oil is supplied to the control valve through an opening 8 in the wall 14 from the oil sump of the screw-type compressor, and flows through the valve spring chamber 9 of the control valve, flushing the expanding region of the control element 3, before it passes through a control outlet 10 in the control piston 2 to enter a bypass opening 11 in the control valve housing 1. The control opening 10 is connected with the bypass line around the heat exchanger. This flow connection is opened when the oil is cold, and as the oil gradually heats it is continuously closed by a displacement of the control piston 2 to the right in the direction of the wall 14.

In addition the control piston 2 has a bypass opening 12 which co-operates with a heat exchanger opening 13 in the valve housing 1. The bypass opening 12 is arranged in relation to the control outlet 10 in the control piston 2 such that already by the time at which normally the entire oil quantity would be conducted through the bypass opening 11, a part quantity of the oil flow is conducted into the heat exchanger opening 13. As a result a conditioning of the oil flow through the heat exchanger is achieved before the control piston 2 is moved so far in the direction of the wall 14 that the control outlet 10 in the control piston 2 co-operates with the heat exchanger opening 13 and the inlet into the bypass opening 11 is closed.

LIST OF REFERENCE NUMERALS

1 Control valve housing
2 Control piston
3 Control element
4 Piston
5 Screw plug
6 Carrier wall
7 Valve spring
8 Opening
9 Valve spring chamber
10 Control outlet
11 Bypass opening
12 Bypass opening
13 Heat exchanger opening
14 Wall
11A Triangular control outlet
11B Trapezoid control outlet

The invention claimed is:

1. A control valve for an oil-injected screw-type compressor, comprising:
 a control piston; and
 a control element which actuates the control piston and co-operates with a heat exchanger opening disposed in a control valve housing and a bypass opening,
 a control opening extending through a wall of the control piston;
  wherein the control piston controls the movement of at least one further bypass opening extending through a wall of the control piston, the at least one further bypass opening co-operating with the heat exchanger opening,
  wherein the control piston controls movement of oil through the control opening into the bypass opening, and
  wherein the control valve is included in a screw-type compressor housing.

2. The control valve of claim 1, wherein the at least one further bypass opening is arranged in the control piston.

3. The control valve of claim 1, wherein the at least one further bypass opening is arranged in the control valve housing.

4. The control valve of claim 1, wherein the at least one further bypass opening is a leakage opening.

5. The control valve of claim 1, wherein the at least one further bypass opening is circular.

6. The control valve of claim 1, wherein the control opening is arranged in the control valve housing.

7. The control valve of claim 1, wherein the geometry of the control opening is designed such that upon steady displacement of the control piston, the increase in area of the exposed control opening to the heat exchanger opening is not linear thereto.

8. The control valve of claim 1, wherein the control opening is circular.

9. The control valve claim 1, wherein the control opening is triangular or trapezoid.

10. The control valve of claim 1, wherein the control element is an expanding element.

11. The control valve of claim 1, wherein a gap between the control valve housing and the control valve piston is formed so narrow that the resulting flow is less than the flow through the bypass opening.

12. The control valve of claim 1, wherein oil is supplied in a controlled manner via the control valve to a heat exchanger and/or to a bypass in such a way that cold oil is conducted through a bypass around the heat exchanger and warm oil is conducted through the heat exchanger.

13. The control valve of claim 1, wherein the control opening is larger in diameter than the diameter of the bypass outlet.

\* \* \* \* \*